US012729838B2

(12) United States Patent
Wang et al.

(10) Patent No.: US 12,729,838 B2
(45) Date of Patent: Sep. 8, 2026

(54) CEILING LAMP

(71) Applicant: SHENZHEN KOK TECHNOLOGY., LTD, Shenzhen (CN)

(72) Inventors: Binping Wang, Shenzhen (CN); Jinke Liu, Shenzhen (CN); Linlong Ruan, Shenzhen (CN)

(73) Assignee: SHENZHEN KOK TECHNOLOGY., LTD, Shenzhen (CN)

( * ) Notice: Subject to any disclaimer, the term of this patent is extended or adjusted under 35 U.S.C. 154(b) by 0 days.

(21) Appl. No.: 19/326,785

(22) Filed: Sep. 12, 2025

(65) Prior Publication Data

US 2026/0078892 A1 Mar. 19, 2026

(30) Foreign Application Priority Data

Sep. 14, 2024 (CN) ......................... 202422262955.6

(51) Int. Cl.

*F21V 19/00* (2006.01)
*F21S 8/02* (2006.01)
*F21V 21/04* (2006.01)

(52) U.S. Cl.

CPC ............ *F21V 19/004* (2013.01); *F21S 8/026* (2013.01); *F21V 21/04* (2013.01)

(58) Field of Classification Search

CPC ...... F21V 19/004; F21V 21/04; F21V 21/044; F21S 8/026

See application file for complete search history.

(56) References Cited

U.S. PATENT DOCUMENTS

| | | | | |
|---|---|---|---|---|
| 11,506,377 | B1 * | 11/2022 | Wang | F21V 21/03 |
| 2011/0019429 | A1 * | 1/2011 | Okamura | F21V 21/04 206/320 |
| 2013/0128578 | A1 * | 5/2013 | Yu | F21K 9/20 362/249.02 |
| 2018/0172254 | A1 * | 6/2018 | Liang | F21V 21/0816 |
| 2019/0162395 | A1 * | 5/2019 | Im | F21V 23/023 |
| 2026/0022822 | A1 * | 1/2026 | Yao | F21V 17/16 |
| 2026/0085832 | A1 * | 3/2026 | Shi | F21V 3/02 |

* cited by examiner

*Primary Examiner* — Christopher E Dunay

(74) *Attorney, Agent, or Firm* — Hemisphere Law, PLLC

(57) ABSTRACT

The present disclosure relates to the field of lighting technologies and provides a ceiling lamp including a fixing plate including two arc-shaped openings that are a first arc-shaped opening and a second arc-shaped opening with a width smaller than that of the first arc-shaped opening, a body rotatably mounted on the fixing plate, a control board and a lighting member, two suspension members installed on the body and including a first portion and a second portion suspended on the fixing plate. A diameter of the first portion is adapted to a width of the second arc-shaped opening, a diameter of the second portion greater than the width of the second arc-shaped opening and less than the width of the first arc-shaped opening, a plurality of bulges arranged at intervals on the body and corresponding to the arc-shaped opening, an elastic member installed on the fixing plate and abutting against the body.

17 Claims, 8 Drawing Sheets

CEILING LAMP

CROSS-REFERENCE TO RELATED APPLICATION

This application claims the benefit of priority from Chinese Patent Application No. 202422262955.6 entitled "CEILING LAMP" and filed on Sep. 14, 2024, the content of which is hereby incorporated by reference in its entire by reference.

BACKGROUND

1. Technical Field

The present disclosure generally relates to the field of ceiling lamps, and especially relates to a ceiling lamp.

2. Description of Related Art

In the field of modern architectural lighting, downlights, as an embedded type of downward lighting fixture, have been widely used due to unique structural advantages. It can be cleverly embedded inside the ceiling, for achieving efficient lighting while effectively maintaining an overall unity of a building decoration, avoiding damage to the integrity and aesthetics of the ceiling art due to install the lighting fixtures. This characteristic makes the downlights play an important role in various places such as hotels, family residences, cafes, and office buildings, for creating a soft and comfortable lighting atmosphere for the space and greatly enhancing the overall texture of the environment.

At present, installation and fixing methods of the conventional downlights mostly rely on spring clips to obtain a clamp fixing thereof. The spring clip, with its own elastic properties, demonstrates advantages of convenient operation and stable connection during being installed, so that it can quickly fix the downlights into installation holes of the ceiling, which to some extent meets basic installation needs of conventional downlights.

However, with the continuous development of lighting technologies, LED downlights have become mainstream products in the current market due to their significant advantages such as energy conservation, longevity and environmental protection. but in actual usage, the LED downlights inevitably require maintenance or replacement of parts thereof. At this point, limitations of conventional fixation methods through the spring clips are becoming increasingly prominent, leading to many inconveniences in later maintenance works. Due to a tight elastic clamping structure is formed between the spring clip and the mounting hole of the ceiling, it is often necessary to remove the entire downlight from the ceiling during performing maintenance operations, which not only increases difficulty and labor intensity of maintenance staff, but also may cause unnecessary damage to the ceiling structure or the lamp itself during a disassembly process. Obviously, the conventional fixing method through the spring clip can no longer fully meet requirements of installation convenience and maintenance flexibility of the conventional LED downlights. Therefore, a new installation structure is urgently needed to solve the technical problem above mentioned.

SUMMARY

The technical problems to be solved: in view of the shortcomings of the related art, the present disclosure provides a ceiling lamp which can design a new structure for installing the ceiling lamp and improve an installation convenience and maintenance flexibility of a downlight.

In order to solve the above objectives, a ceiling lamp according to an embodiment of the present disclosure includes:

- a fixing plate installed on a ceiling;
- a body rotatably mounted on the fixing plate;
- a control board received in the body;
- a lighting member received in the body; and wherein
- the fixing plate includes two arc-shaped openings symmetrically arranged about a central axis of the fixing plate, each of the two arc-shaped openings including a first arc-shaped opening and a second arc-shaped opening, wherein a width of the first arc-shaped opening is greater than that of the second arc-shaped opening; and wherein two suspension members are installed on the body and corresponding to the fixing plate, each of the two suspension members is a stepped-shaft structure and includes a first portion and a second portion arranged at an end of the first portion that is away from the body, wherein a diameter of the first portion is adapted to the width of the second arc-shaped opening, and a diameter of the second portion is larger than the width of the second arc-shaped opening and smaller than the width of the first arc-shaped opening, the second portion suspended on the fixing plate; and wherein a plurality of bulges is arranged at intervals on the body and corresponding to the arc-shaped opening, and evenly distributed around a central axis of the fixing plate, an elastic member installed on the fixing plate and abutting against the body; and wherein when the body rotates, the elastic member is lifted by one of the plurality of bulges and then enters between two adjacent bulges to produce a sound thereof.

Wherein the elastic member includes a housing, an elastic element and a sliding element, one end of the housing passing through the fixing plate, and the other end of the housing including a flanging attached to the fixing plate, the housing including a chamber that faces the body, the elastic element and the sliding element sequentially arranged in the chamber, and a part of the sliding element extending out of the chamber to elastically abut against the body.

Wherein the sliding element is a spherical structure, and a diameter of a side of the chamber that is near the body is smaller than a diameter of the sliding element, so that the sliding element slides inside the chamber.

Wherein an anti-detachment protrusion is formed on a side wall of the second arc-shaped opening that is near the first arc-shaped opening.

Wherein the anti-detachment protrusion is an arc-shaped structure.

Wherein the body includes a bottom plate and a frame, wherein a receiving room is formed inside the frame, and the bottom plate covers on the frame, wherein the control board and the lighting member are arranged inside the receiving room.

Wherein the bottom plate is recessed towards a side that is away from the fixing plate to form a complete circle of groove, wherein the fixing plate includes a protruding wall adapted to the groove and correspondingly inserted into the groove.

Wherein a cross-sectional shape of the groove is V-shaped.

Wherein the body further includes a flexible backing plate, a receiving groove formed between the frame and the bottom plate, the flexible backing plate installed within the receiving groove and extending out of the receiving groove.

Wherein the lighting member includes an LED light board electrically connected to the control board, and a transparent cover arranged on a side of the body that is away from the fixing plate.

Wherein an angle between two adjacent bulges ranges from 2 degrees to 8 degrees.

Wherein the angle between two adjacent bulges is 5 degrees.

Wherein both the fixing plate and the bottom plate are sheet metal parts.

Wherein the flanging is fixed to the fixing plate by an adhesive bonding way.

Wherein the frame is square.

A ceiling lamp according to another embodiment of the present disclosure includes:

- a fixing plate installed on the outside;
- a body rotatably mounted on the fixing plate;
- a control board and a lighting member respectively received in the body; and wherein
- the body includes a bottom plate, a frame and a suspension member installed on the bottom plate, wherein a receiving room is formed inside the frame, the bottom plate covers on the frame, and both the control board and the lighting member are arranged inside the receiving room; and wherein the suspension member is a stepped-shaft structure and comprises a first portion installed on the bottom plate, and a second portion arranged at an end of the first portion that is away from the body; and wherein the fixing plate includes arc-shaped openings comprising a first arc-shaped opening and a second arc-shaped opening interconnected with the first arc-shaped opening, wherein a diameter of the first portion is adapted to a width of the second arc-shaped opening, and a diameter of the second portion is larger than the width of the second arc-shaped opening and smaller than a width of the first arc-shaped opening; and wherein an anti-detachment protrusion is formed on a side wall of the second arc-shaped opening, a receiving hole is formed between the anti-detachment protrusion and an end of the second arc-shaped opening that is away from the first arc-shaped opening, and the first portion is received in the receiving hole.

Wherein the fixing plate includes an expansion portion formed near the anti-detachment protrusion and connected to the second arc-shaped opening, an elastic wall formed between the second arc-shaped opening and the expansion portion, the anti-detachment protrusion arranged on the elastic wall.

Wherein the ceiling lamp further includes a fixing disk, wherein the fixing plate is fixed to the fixing disk, and the fixing plate is fixed to the ceiling.

Wherein the fixing disk includes two third arc-shaped openings opposite to each other, and an outer side of the third arc-shaped opening is marked with an angle scale marking.

Wherein the fixing disk further includes two fourth arc-shaped openings opposite to each other, and a diameter of a circle where the fourth arc-shaped opening is located is larger than a diameter of a circle where the third arc-shaped opening is located.

The ceiling lamp of the present disclosure, with the help of a matching structure of the suspension member and the arc-shaped groove, changes a conventional fixing method of spring clips to improve an installation convenience and maintenance flexibility of a downlight.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
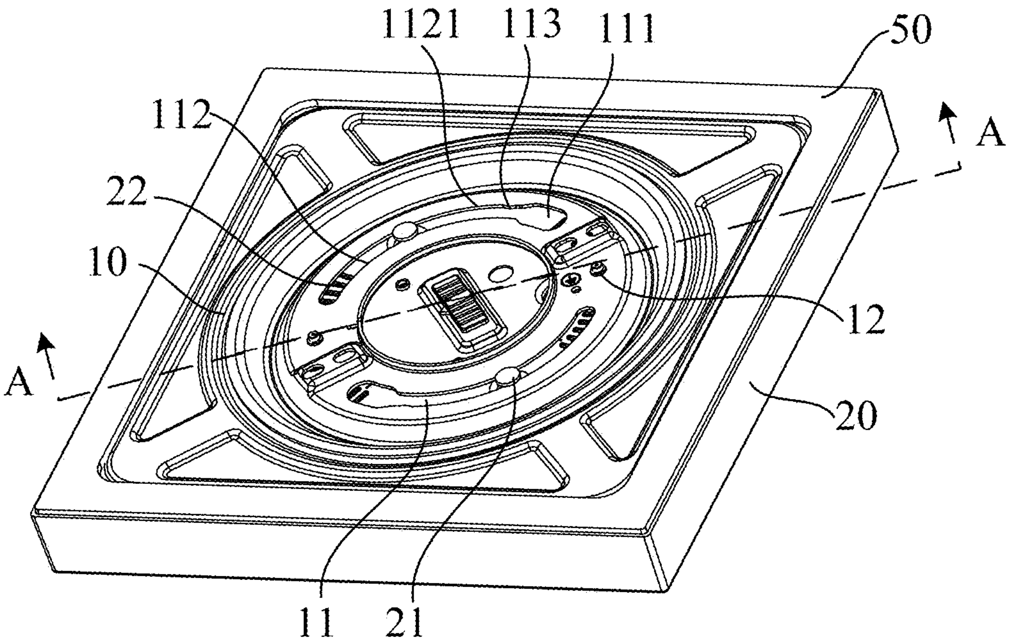
FIG. 1 is a schematic view of a ceiling lamp in accordance with an embodiment of the present disclosure.
Figure 2:
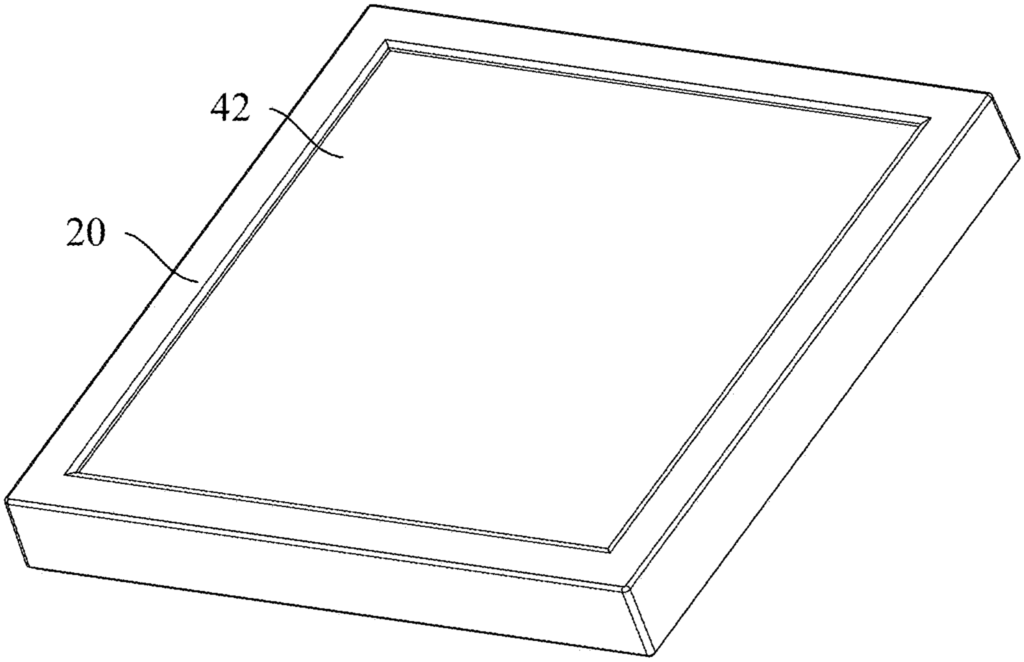
FIG. 2 is similar to FIG. 1, but shown from and view.
Figure 3:
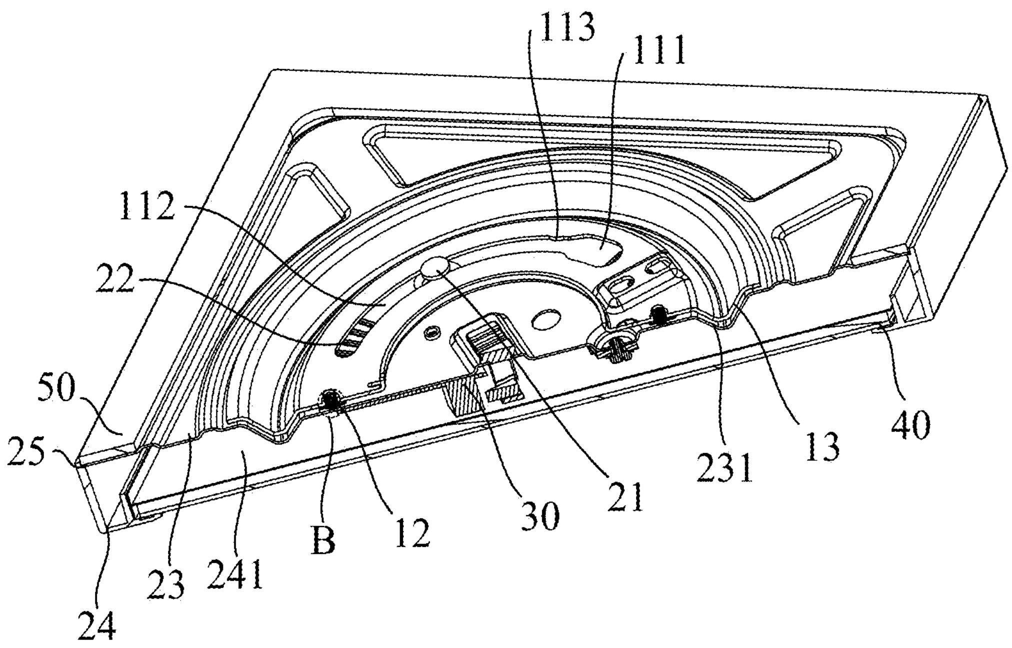
FIG. 3 is a cross-sectional view of the ceiling lamp along a line A-A of FIG. 1.
Figure 4:
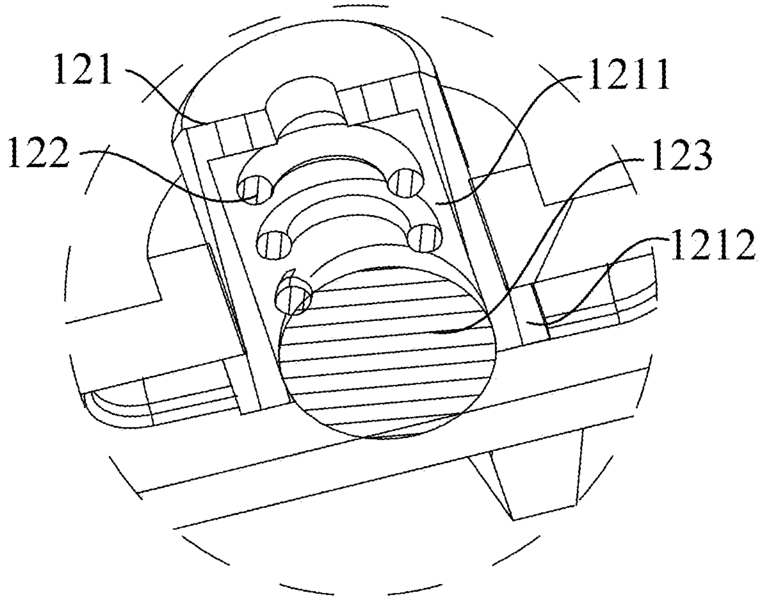
FIG. 4 is an enlarged view of a circle B of FIG. 3.
Figure 5:
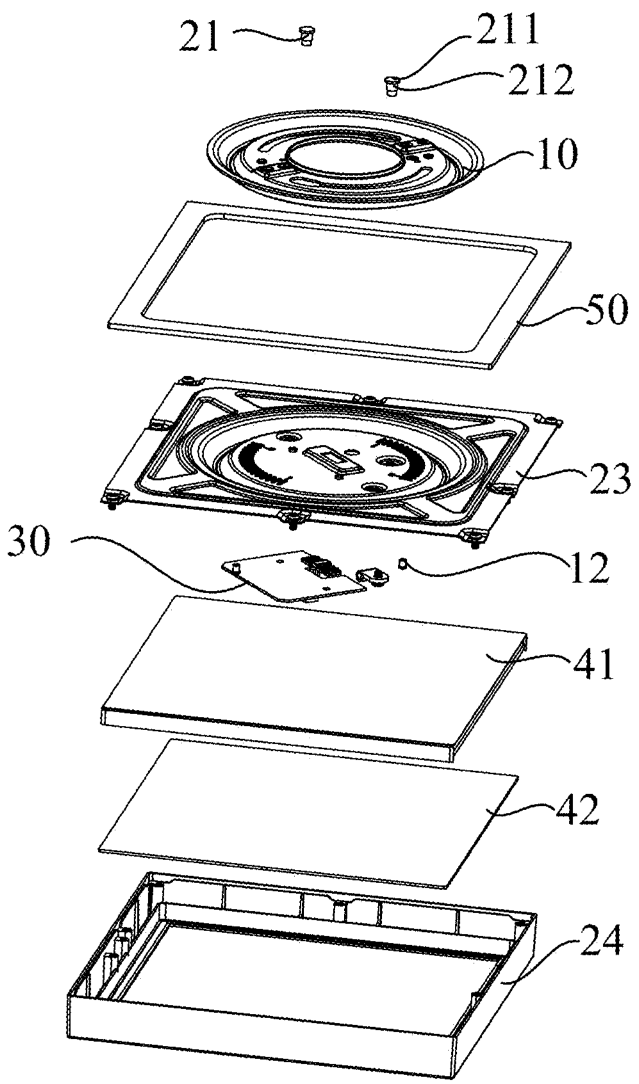
FIG. 5 is an exploded, schematic view of the ceiling lamp of FIG. 1.
Figure 6:
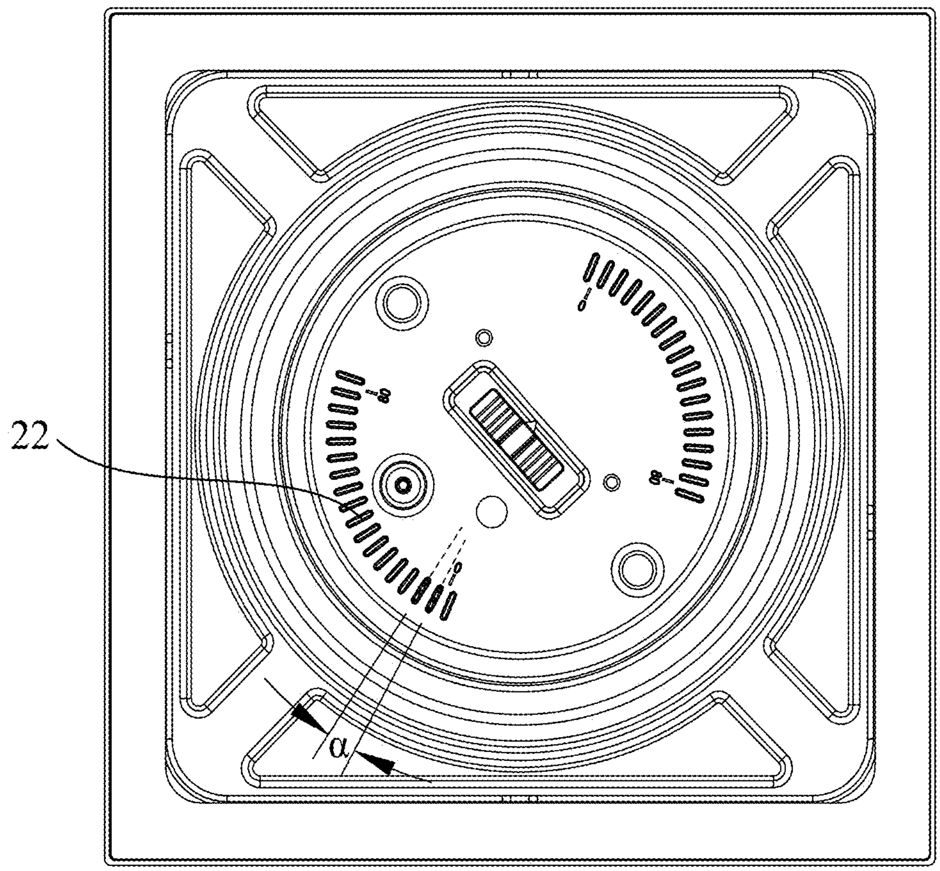
FIG. 6 is a partial schematic view of the ceiling lamp of FIG. 1.
Figure 7:
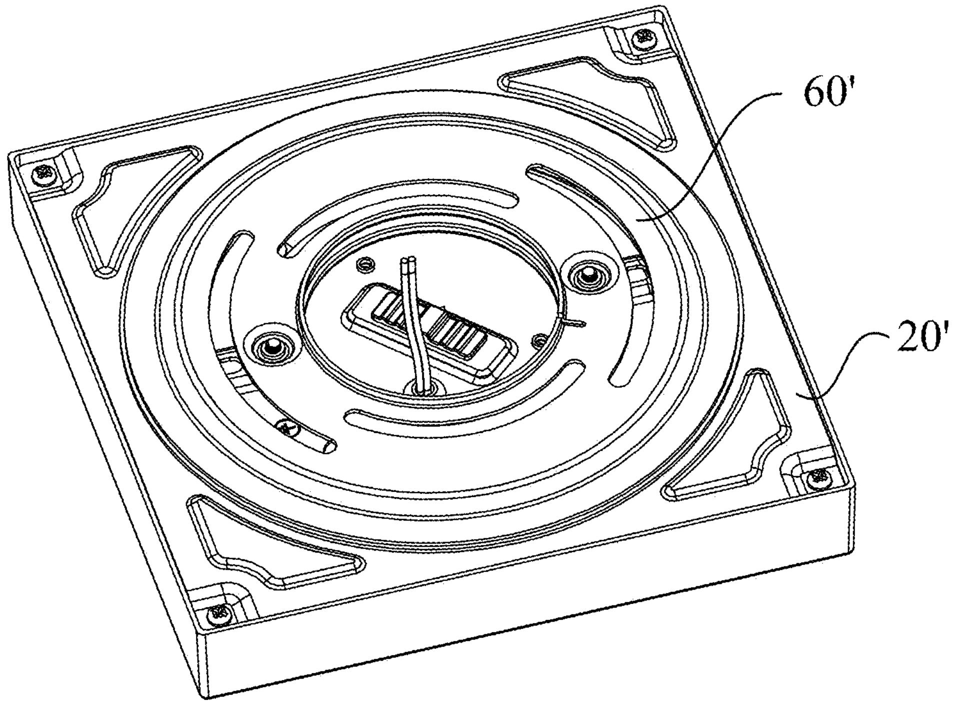
FIG. 7 is a schematic view of a ceiling lamp in accordance with another embodiment of the present disclosure.
Figure 8:
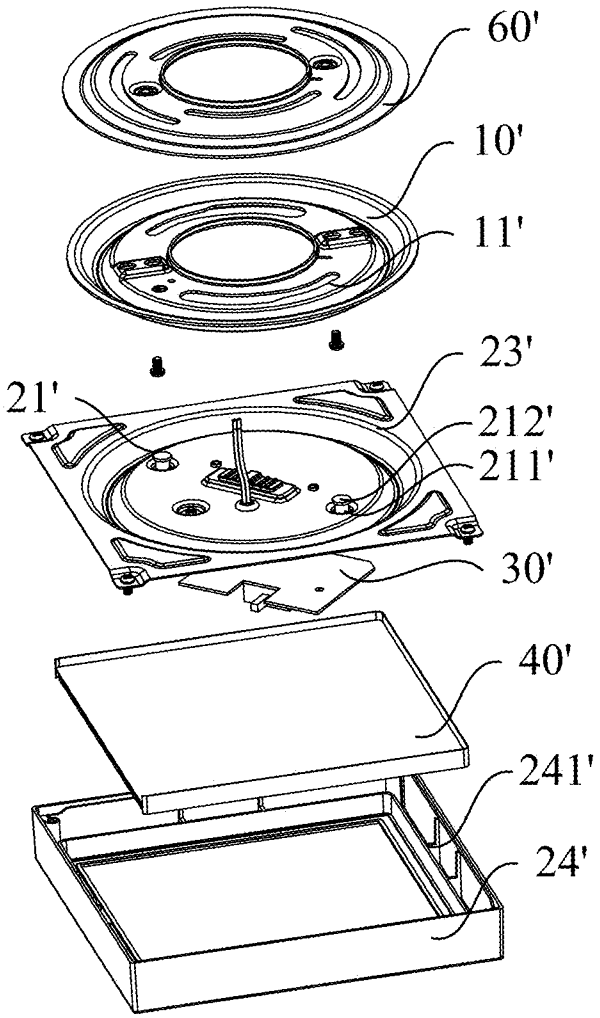
FIG. 8 is an exploded, schematic view of the ceiling lamp of FIG. 7.
Figure 9:
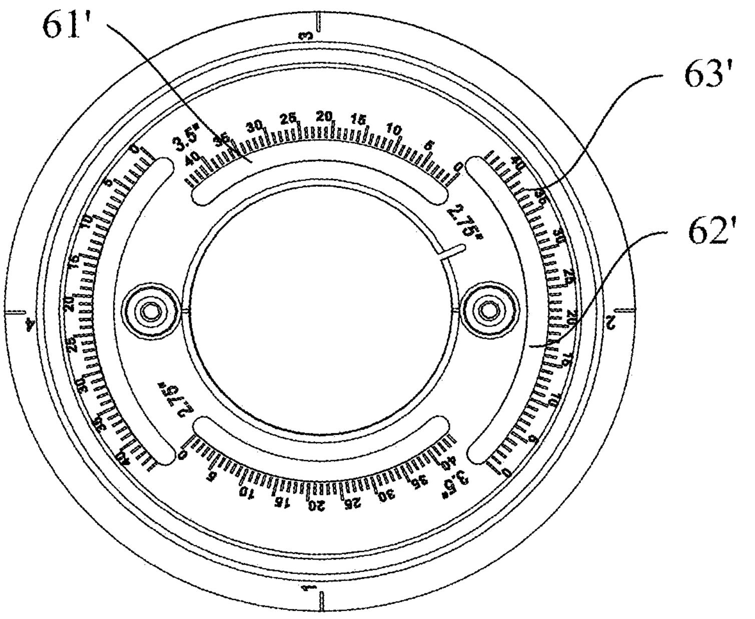
FIG. 9 is a schematic view of a fixing disk of the ceiling lamp of FIG. 7.
Figure 10:
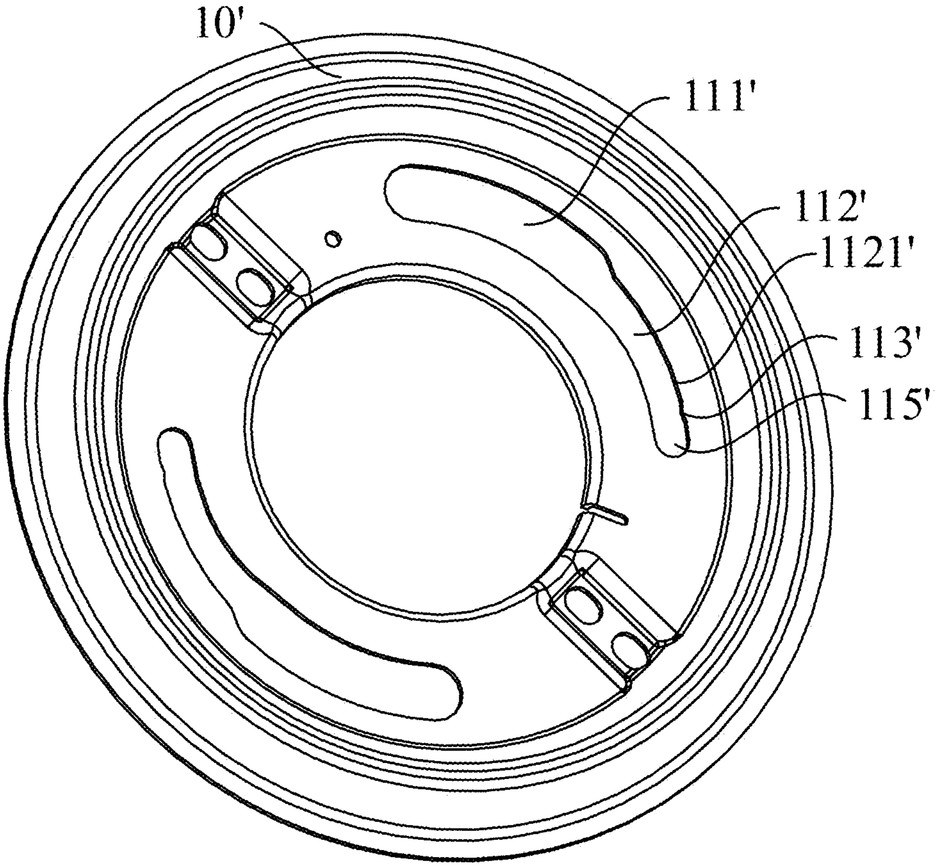
FIG. 10 is a schematic view of a fixing plate of the ceiling lamp of FIG. 7.

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be noted that if terms such as directional indications of "up", "down", "left", "right", "front" and "back", etc. are involved in the embodiments of the present disclosure, the directional indications are only used to explain a relative position relationship and a motion condition etc between components in a specific posture. If the specific posture changes, the directional indications will also change accordingly. The terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

In addition, the terms such as "first" and "second" shown in the specification are only used to describe, but not indicated that the elements of the present disclosure is important or represented the amount of the elements. That is, the features limited by the terms of "first" and "second" may explicitly or implicitly include one or more features. It should also be further understood that the term "and/or" used in the description of the present disclosure refers to include three parallel schemes that it is taken "A and/or B" as an example, which includes an A scheme, or a B scheme, or both A and B schemes. In addition, technical solutions among various embodiments can be combined with each other, but it should be implemented for one of ordinary skill in the related art. When the combination of technical solutions is contradictory or impossible to be implemented, it should be considered that such combination of technical solutions does not exist and is not within the protection scope of the present disclosure.

Referring to FIGS. 1-5, a ceiling lamp according to an embodiment of the present disclosure includes a fixing plate 10, a body 20, a control board and a lighting member 40. The fixing plate 10 us installed on a ceiling, the body 20 rotatably mounted on the fixing plate 10, both the control board 30 and the light member 40 received in the body 20. The fixing plate 10 includes two arc-shaped openings 11 symmetrically arranged about a central axis of the fixing plate 10, each of the two arc-shaped openings 11 including a first arc-shaped opening 111 and a second arc-shaped opening 112, wherein a width of the first arc-shaped opening 111 is greater than that of the second arc-shaped opening 112; and wherein two suspension members 21 are installed on the body 20 and corresponding to the fixing plate 10, each of the two suspension members 21 is a stepped-shaft structure and includes a first portion 211 and a second portion 212 arranged at an end of the first portion 211 that is away from the body 20, wherein a diameter of the first portion 211 is adapted to the width of the second arc-shaped opening 112, and a diameter of the second portion 212 is larger than the width of the second arc-shaped opening 112 and smaller than the width of the first arc-shaped opening 111, the second portion 212 suspended on the fixing plate 10; and wherein a plurality of bulges 22 is arranged at intervals on the body 20 and corresponding to the arc-shaped opening 11, and evenly distributed around a central axis of the fixing plate 10, an elastic member 12 installed on the fixing plate 10 and abutting against the body 20; and wherein when the body 20 rotates, the elastic member 12 is lifted by one of the plurality of bulges 22 and then enters between two adjacent bulges 22 to produce a sound thereof.

Specifically, the fixing plate 10 serves as a connecting component between the ceiling lamp and the ceiling, and its core feature is that there are two arc-shaped openings 11 that are symmetrical about its own central axis thereof. Each arc-shaped opening 11 is composed of the first arc-shaped opening 111 and the second arc-shaped opening 112, wherein the width of the first arc-shaped opening 111 is greater than that of the second arc-shaped opening 112. At the same time, the fixing plate 10 is also equipped with the elastic member 12 for cooperating and interacting with the body 20, and the body 20 serves as a core load-bearing component of the ceiling lamp, to be configured for installing the control board 30 and lighting members 40. The two suspension members 21 are installed at positions corresponding to the fixing plate 10, and the plurality of bulges 22 is arranged at intervals to be corresponding to the arc-shaped openings 11. These bulges 22 are uniformly arranged around the central axis of the fixing plate 10. The control board 30 that serves as a functional component is installed inside the body 20, and configured to control a lighting function of the ceiling lamp. The lighting members 40 are installed inside the body 20 to provide illumination for the space. The suspension member 21 is designed as a stepped shaft structure, which specifically includes the first portion 211 and the second portion 212, where the second portion 212 is arranged at the end of the first portion 211 that is away from the body 20. The diameter of the first portion 211 is adapted to the width of the second arc-shaped opening 112 of the fixing plate 10, and the diameter of the second portion 212 is larger than the width of the second arc-shaped opening 112 and smaller than the width of the first arc-shaped opening 111. The elastic member 12 is installed on the fixing plate 10 and has the ability of elastic deformation, which can form a contact fit with the bugle 22 of the body 20.

The fixing plate 10 is installed on the ceiling through a fixing structure, and serves as an installation reference for the entire ceiling lamp. The body 20 is rotatably connected to the fixing plate 10 through the bugle 21: the second portion 212 of the suspension member 21 is hung on the fixing plate 10, and the first portion 211 passes through the second arc-shaped opening 112 of the arc-shaped opening 11. By utilizing adaptability of the widths of the first portion 211 and the second arc-shaped opening 112, as well as a dimensional relationship between the widths of the second portion 212, the first arc-shaped opening 111 and the second arc-shaped opening 112, so that the body 20 can be suspended and limited on the fixing plate 10. Both the control board 30 and the lighting member 40 are fixed inside the body 20 in a built-in installation manner, thereby forming an integrated functional module with the body 20. The elastic member 12 that is installed on the fixing plate 10 is in contact with the bugle 22 of the body 20, so that when the body 20 rotates, the elastic member 12 interacts with the bugle 22.

The present disclosure utilizes a cooperative structure of the suspension member 21 and the arc-shaped opening 11 to change the conventional fixing method of the spring clamp. During installation, the second portion 212 of the suspension member 21 can be inserted through the first arc-shaped opening 111, and then the body 20 rotates to fix the first portion 211 into the second arc-shaped opening 112. During maintenance, there is no need to disassemble the entire unit. It only needs to simply rotate the body 20 to return the suspension member 21 from the second arc-shaped opening 112 to the first arc-shaped opening 111, and the body 20 can be partially lowered, which can effectively solve the problem that the conventional downlight is overall disassembly and assembly during maintenance, thereby reducing maintenance difficulty and labor intensity.

By utilizing the matching relationship between the suspension member 21 that is the stepped-shaft structure and the arc-shaped opening 11, as well as a suspension limit effect of the second portion 212 for the body 20, it can ensure that the body 20 is firmly connected to the fixing plate 10, rather than being easily detached, thereby ensuring usage safety of the ceiling lamp.

When the body 20 rotates, the elastic member 12 is lifted up by the bugle 22 and then enters between next two adjacent bugles 22, thereby resulting in making a "click" sound during the process, to provide clear operational feedback, which facilitates the perception of the rotational position status of the body 20, thereby improving the accuracy and experience of operations.

The uniform arrangement of the plurality of bugles 22 and the coordinated design of the elastic members 12, which can enable regular positioning and feedback during the rotation of the body 20. Combined with the arc-shaped opening 11 that is symmetrically arranged and the suspension member 21, it ensures the rotation smoothness of the body 20 and a balance of structural forces.

Furthermore, the elastic member 12 includes a housing 121, an elastic element 122 and a sliding element 123, one end of the housing 121 passing through the fixing plate 10, and the other end of the housing 121 including a flanging 1212 attached to the fixing plate 10, the housing 1212 including a chamber 1211 that faces the body 20, the elastic element 122 and the sliding element 123 sequentially arranged in the chamber 1211, and a part of the sliding element 123 extending out of the chamber 1211 to elastically abut against the body 20.

Specifically, the housing 121 is a hollow structure, with one end being a cylindrical portion that can pass through the fixing plate 10, and the other end having the flanging 1212 that is a structure extending outwardly and can be tightly adhered to a surface of the fixing plate 10. Internally, the chamber 1211 that extends axially towards the body 20 is formed inside of the housing 121, for providing a receiving room for the elastic element 122 and the sliding element 123. The elastic element 122 has the ability of elastic deformation and can adopt elastic structures such as springs. The elastic element 122 is set inside the chamber 1211 of the housing 121 and can produce elastic expansion and contraction during being subjected to a force. The sliding element 123 is a structure adapted to the chamber 1211, which can slide axially inside the chamber 1211. A part of the sliding element 123 can extend outside the chamber 1211 and maintain contact with the body 20.

The housing 121 is fixedly connected to the fixing plate 10 by one end of the housing 121 passing through the fixing plate 10 and the flanging formed at other end of the housing attaching to the fixing plate 10. The elastic element 122 and the sliding element 123 are sequentially assembled in the chamber 1211 of the housing 121. One end of the elastic element 122 is in contact with the bottom of the chamber 1211, and the other end is connected to the sliding element 123, for providing elastic support to the sliding element 123. Under an action of the elastic element 122, an elastic contact relationship is formed between the body 20 and a part of the sliding element 123 that extends out of the chamber 1211, which can generate a corresponding sliding displacement with the rotation or movement of the body 20.

The housing 121 can be stably installed on the fixing plate 10 through a fitting design that is formed between the flanging 1212 and the fixing plate 10, so that it can ensure that the elastic member 12 is not easy to loosen or shift during being used. The continuous elastic support that the elastic element 122 is applied for the sliding element 123 ensures that the sliding element 123 always maintains a tight contact with the body 20, thereby ensuring the stability of the interaction feedback between the elastic member 12 and the body 20. A sliding fit of the sliding element 123 and the elastic force of the elastic element 122 work together to ensure that during the rotation of the body 20, the elastic member 12 can be accurately lifted and reset by the bulge 22, stably produce the feedback sound and ensure a reliable implementation of the operation feedback function.

In some embodiment of the present disclosure, the flanging 1212 that is arranged on the other end of the housing 121 is attached to the surface of the fixing plate 10. The flanging 1212 can be fixed to the fixing plate 10 by adhesive bonding or other adaptive methods such as screws. Whether using the adhesive method or other fixing methods, it can ensure that the flanging 1212 is firmly connected to the fixing plate 10, thereby effectively preventing the housing 121 from loosening or shifting during being used, and ensuring the overall structural stability of the elastic member 12.

Furthermore, the sliding element 123 is a spherical structure, and a diameter of a side of the chamber 1211 that is near the body 20 is smaller than a diameter of the sliding element 123, so that the sliding element 123 slides inside the chamber 1211.

Specifically, in an embodiment of the present disclosure, the sliding element 123 is spherical, with a rounded spherical shape as a whole, which can form a fitting relationship with the chamber 1211 and slide along an axial direction of the chamber 1211. An inner wall diameter of the chamber 1211 near the body 20 has been specifically designed to be smaller than the diameter of the sliding element 123, for forming a limiting structure thereof. The sliding element 123, as the spherical structure, is received inside the chamber 1211 of the housing 121, and in contact with the inner wall of the chamber 1211. Because the diameter of the side of the chamber 1211 that is close to the body 20 is smaller than that of the sliding element 123, when the sliding element 123 slides in the chamber 1211 along the axial direction towards the body 20, it will be blocked by the limiting structure of the chamber 1211 and cannot continue to move outwardly, thus forming a restriction on a sliding range thereof.

The sliding element 123 of the spherical structure is adapted to the chamber 1211, which can reduce the frictional resistance during the sliding process, slide smoother, and ensure that the axial sliding action of the sliding element 123 in the chamber 1211 is flexible and reliable. The side of the chamber 1211, which is closer to the body 20, has a diameter smaller than that of the sliding element 123, so that it can accurately limit the sliding element 123 and effectively prevent the sliding element 123 from slipping out of the chamber 1211 of the housing 121 during the sliding process, thereby ensuring that the sliding element 123 always moves inside the chamber 1211 and improving the structure stability and safety of the elastic member 12.

Furthermore, an anti-detachment protrusion 113 is formed on a side wall 1121 of the second arc-shaped opening 112 that is near the first arc-shaped opening 111.

Specifically, in the second arc-shaped opening 112 of the arc-shaped opening 11, the anti-detachment protrusion 113 is provided on the side wall 1121 that is near the first arc-shaped opening 111. The anti-detachment protrusion 113 is a structure that extends from the side wall 1121 to the interior of the second arc-shaped opening 112, for forming a locally reduced size area. The anti-detachment protrusion 113 is arranged on the side wall 1121 of the second arc-shaped opening 112 that is adjacent to the first arc-shaped opening 111. When the first portion 211 of the suspension member 21 slides from the first arc-shaped opening 111 into the second arc-shaped opening 112 and is positioned, the anti-detachment protrusion 113 will form a lateral obstruction to the first portion 211. Due to the diameter of the first portion 211 being adapted to the width of the second arc-shaped opening 112, the anti-detachment protrusion 113 makes it difficult for the first portion 211 to slide back from the second arc-shaped opening 112 to the first arc-shaped opening 111 without any external driving forces.

The anti-detachment protrusion 113 can effectively limit the sliding range of the first portion 211 of the suspension member 21 within the second arc-shaped opening 112, so that it can avoid accidental contact or vibration to cause the first portion 211 to slide out of the second arc-shaped opening 112, thereby significantly improving the connection stability between the body 20 and the fixing plate 10, and preventing the body 20 from being accidentally fallen off. When the body 20 is installed in place, the anti-detachment protrusion 113 forms an additional safety guarantee thereof, thereby ensuring a more reliable fit between the suspension member 21 and the second arc-shaped opening 112, reducing safety hazards caused by loosening after being installed. The anti-detachment protrusion 113 is provided that a certain external force is required to be applied when the body 20 switches from an installation state to a disassembly state, thereby avoiding the displacement of the body 20 caused by mis-operation, while not affecting the disassembly operation during normal maintenance, and achieving a balance between stability and operability thereof.

Furthermore, the anti-detachment protrusion 113 is an arc-shaped structure. Specifically, the anti-detachment protrusion 113 adopts an arc-shaped protrusion structure, which is arranged on the side wall 1121 of the second arc-shaped opening 112 that is near the first arc-shaped opening 111 of the arc-shaped opening 11. It extends in an arc-shape from the side wall 1121 to the inside of the second arc-shaped opening 112, for forming the locally reduced size area. The anti-detachment protrusion 113 adopts an arc-shaped protrusion structure to reduce rigid angular contact that the anti-detachment protrusion 113 is in contact with the first portion 211, reduce wear between the anti-detachment protrusion 11 and the first portion 211 during relative sliding therebetween, and extend the service life thereof.

Furthermore, the body 20 includes a bottom plate 23 and a frame 24, wherein a receiving room 241 is formed inside the frame 24, and the bottom plate 23 covers on the frame 24, wherein the control board 30 and the lighting member 40 are arranged inside the receiving room 241. The frame 24 is square.

Specifically, the body 20 consists of two parts: the bottom plate 23 and the frame 24. The frame 24 is a square frame structure with a certain contour, and the receiving room 241 is formed for accommodating components. The bottom plate 23 is a plate-shaped structure adapted to the square contour of the frame 24, which can serve as a closed component for the receiving room 241. The receiving room 241 is enclosed by the interior of the square frame 24, for forming a square space that is compatible with the frame 24. It has a certain space capacity and can provide an installation space for the control board 30 and the lighting member 40. The bottom plate 23 and the square frame 24 are connected by a covering method, with the bottom plate 23 covering an opening of the square frame 24, for sealing the receiving room 241 inside the frame 24 to form a relatively independent square space. The control board 30 and the lighting member 40, as functional components of the body 20, are set and fixed inside the receiving room 241 that is enclosed by the square frame 24 and the bottom plate 23.

A regular shape of the receiving room 241 facilitates an arrangement and installation of rectangular or square components such as the control board 30 and the lighting member 40, thereby enabling more efficient use of internal spaces and improving the layout rationality of components thereof. The square contour has clear corner positioning characteristics, which can provide clear positioning references during the assembly of the bottom plate 23 and the frame 24, as well as the installation of internal components thereof, thereby reducing assembly errors and improving assembly efficiency thereof. The square frame 24 is designed to make the body 20 more suitable for ceiling decoration scenes with modern minimalist styles, which can form visual coordination with the square ceiling structure or decorative elements, thereby enhancing the overall unity of lighting devices and building decoration.

Furthermore, the bottom plate 23 is recessed towards a side that is away from the fixing plate 10 to form a complete circle of groove 231, wherein the fixing plate 10 includes a protruding wall 13 adapted to the groove 231 and correspondingly inserted into the groove 231.

Specifically, the bottom plate 23 is recessed towards the side that is away from the fixing plate 10, for forming the continuous groove 231. The groove cavity 231 is distributed around an edge or a specific area of the bottom plate 23, with a regular contour thereof. The fixing plate 10 is formed with the protruding wall 13 at the position corresponding to the groove 231 of the bottom plate 23, and a contour and a size of the protruding wall 13 are adapted to the groove 231, which can form a fitting fit with the groove 231.

When the body 20 is assembled with the fixing plate 10, the protruding wall 13 of the fixing plate 10 is precisely inserted into the groove 231 of the bottom plate 23, for forming a tight fitting connection between the body 20 and the fixing plate 10, thereby strengthening the positioning fit between the body 20 and the fixing plate 10. The fitting between the groove 231 and the protruding wall 13 provide precise guidance for the assembly of the body 20 and the fixing plate 10, thereby ensuring the accurate installation position of the body 20 and avoiding deviation thereof. The groove 231 is engaged with the protruding wall 13 to form a guide and limit during the rotation of the body 20, for avoiding the shaking or deviation of the body 20, thereby significantly improving the smoothness and reliability of the rotation operation of the body 20, and making the rotation operation smoother and more reliable.

Furthermore, a cross-sectional shape of the groove 231 is V-shaped. The V-shaped cross-section can provide more precise guidance for the protruding wall 13. When the protruding wall 13 is inserted into the groove 231, it can be quickly aligned and fitted through the guidance of an inclined surface, for reducing assembly deviation thereof. The V-shaped cross-section forms a line contact fit with the protruding wall 13. During the rotation of the body 20, this structure can provide a more uniform support force, to effectively limit a radial shaking of the body 20, further improve the rotation smoothness thereof, and reduce the risk of jamming thereof. The V-shaped cross-section is provided to allow for slight dimensional errors or assembly deviations, while still ensuring stable contact between the protruding wall 13 and the groove 231, thereby reducing poor fit caused by processing or installation accuracy issues thereof.

Furthermore, the body 20 further includes a flexible backing plate 50, a receiving groove 25 formed between the frame 24 and the bottom plate 23, the flexible backing plate 50 installed within the receiving groove 25 and extending out of the receiving groove 25.

Specifically, in an embodiment of the present disclosure, the flexible backing plate 50 is added to the body 20, and the receiving groove 25 is formed between the frame 24 and the bottom plate 23, the receiving groove 25 has a shape and a size that is suitable for the flexible backing plate 50. The flexible backing plate 50 is a sheet-like structure with a certain degree of elasticity, with a size slightly larger than that of the receiving groove 25, which can be installed inside the receiving groove 25 and partially extend out of the receiving groove 25. The flexible backing plate 50 is installed inside the receiving groove 25 that is formed between the frame 24 and the bottom plate 23. The receiving groove 25 plays a positioning and load-bearing role for the flexible backing plate 50, and a part of the flexible backing plate 50 that extends out of the receiving groove 25 can be in contact with related components.

The elastic properties of the flexible backing plate 50 can provide cushioning between the frame 24 and the bottom plate 23, as well as between the flexible backing plate 50 and other contact parts, thereby reducing collisions and noise caused by vibrations in the internal components of the body 20 and improving stability during being used. The part of the flexible backing plate 50 extending out of the receiving groove 25 can be tightly adhered to the contact parts, filling gaps for further enhancing the sealing performance of the body 20, effectively blocking dust and other impurities from entering the interior of the receiving room 241. It can avoid rigid contact that is formed between the frame 24 and the bottom plate 23, as well as between the body 20 and other components, to reduce the wear probability thereof, extend the service life of components, and protect the internal control board 30 and the lighting member 40 from being externally impacted.

Furthermore, the lighting member 40 includes an LED light board 41 electrically connected to the control board 30, and a transparent cover 42 arranged on a side of the body 20 that is away from the fixing plate 10.

Specifically, the lighting member 40 consists of the LED light board 41 and the transparent cover 42. The LED light board 41 is a plate-shaped structure integrated with LED light sources, which has high-efficiency luminous characteristics. The transparent cover 42 is a plate-shaped component with transparent properties, and arranged on the side of the body 20 that is away from the fixing plate 10, which can diffuse or transmit light. The LED light board 41, as a core light-emitting component, can be electrically connected to the control board 30 to achieve lighting functions such as illumination, dimming and color change under the control of the control board 30, for meeting lighting needs of different scenarios. The transparent cover 42 is located on a light-emitting side of the LED light board 41, which can diffuse and evenly distribute the light emitted by the LED light board 41, thereby making the light softer and more uniform, avoiding glare and improving lighting comfort. The transparent cover 42 covers on the side of the body 20 away from the fixing plate 10, which can provide physical protection for the internal LED light board 41, reduce the direct contact of external dust and impurities with the LED light board, and reduce the risk of external damage to the LED light board 41, thereby extending the service life of the lighting members 40.

Furthermore, an angle between two adjacent bulges 22 ranges from 2 degrees to 8 degrees.

Specifically, a plurality of bulges 22 is arranged at intervals on the body 20 and corresponding to the arc-shaped opening 11, and evenly distributed around a central axis of the fixing plate 10. The angle between two adjacent bulges 22 is set within the range of 2 to 8 degrees. The angle $\alpha$ between the two bulges 22 is an angle that is between midlines of the two bulges 22. The angle setting creates a uniform and dense distribution that the plurality of bulges 22 is arranged on the body 20, for forming a gap between two adjacent bulges 22 so that the elastic member 12 can slide in the gap. The elastic member 12 can move back and forth between the gaps of adjacent bulges 22 when the body 20 rotates. The spacing angle between 2 degrees and 8 degrees makes that the bulges 22 are densely distributed. During the rotation of the body 20, an interaction frequency between the elastic member 12 and the bulges 22 is higher, which can achieve more precise rotation positioning adjustment and meet precise control requirements for the position of the body 20 in different installation and operation scenarios. The dense angle distribution makes lifting and resetting actions of the elastic member 12 more coherent, and the feedback sound interval is uniform and dense, for providing clearer and more intuitive operation feedback and improving the accuracy of operation perception. The uniform and small angle spacing design reduces the jerkiness during the rotation of the body 20, thereby making the rotation process smoother and more fluid. Combined with the guiding effect of the groove 231 and the protruding wall 13, it further ensures the rotation smoothness of the body 20.

Furthermore, the angle between two adjacent bulges 22 is 5 degrees.

Specifically, in an embodiment of the present disclosure, the angle between two adjacent bulges 22 is set to 5 degrees, which is within a reasonable range of 2 to 8 degrees, and is uniformly arranged around the central axis of the fixing plate 10 on the body 20. Adjacent bulges 22 are distributed at a 5-degree angle interval, for forming a corresponding mating relationship with the sliding element 123 of the elastic member 12. When the body 20 rotates every 5 degrees, the sliding element 123 will slide from the bulge 22 into the gap between adjacent bulges 22 under an action of an elastic force. The angle of 5 degrees is an integer and within a commonly usage angle range, which facilitates to perform angle calculation during design, production, installation and debugging processes, thereby simplifying relevant parameter settings and operation process thereof. This angle interval will not cause too frequent feedback and a cumbersome operation due to an angle too small, nor will it cause insufficient adjustment accuracy due to an angle too large, thereby balancing the adjustment flexibility and accuracy thereof.

Furthermore, both the fixing plate 10 and the bottom plate 23 are sheet metal parts.

Specifically, in an embodiment of the present disclosure, both the fixing plate 10 and the bottom plate 23 are made of sheet metal reinforcement materials, which have certain structural strength and formability, and can meet structural and functional requirements thereof. The sheet metal material endows the fixing plate 10 and the bottom plate 23 with high structural strength, which can stably bear a weight of the body 20 and internal components thereof, for improving stability and durability of the overall structure. The sheet metal parts are easy to be processed and shaped through stamping and other ways, making it convenient to produce specific structures such as the protruding wall 13 of the fixing plate 10 and the groove 231 of the bottom plate 23, thereby ensuring the accuracy and consistency of the components.

Referring to FIG. 7 to FIG. 10, in another embodiment of the present disclosure, a ceiling lamp includes a fixing plate 10' installed on a ceiling, a body 20' rotatably mounted on the fixing plate 10', a control board 30' and a lighting member 40' respectively received in the body 20'.

The body 20' includes a bottom plate 23', a frame 24' and a suspension member 21' installed on the bottom plate 23', wherein a receiving room 241' is formed inside the frame 24, the bottom plate 23' covers on the frame 24', and both the control board 30' and the lighting member 40' are arranged inside the receiving room 241; and wherein the suspension member 21' is a stepped-shaft structure and includes a first portion 211' installed on the bottom plate 23', and a second portion 212' arranged at an end of the first portion 211' that is away from the body 20; and wherein the fixing plate 10' includes arc-shaped openings 11' including a first arc-shaped opening 111' and a second arc-shaped opening 112' interconnected with the first arc-shaped opening 111', wherein a diameter of the first portion 211' is adapted to a width of the second arc-shaped opening 112', and a diameter of the second portion 212' is larger than the width of the second arc-shaped opening 112' and smaller than a width of the first arc-shaped opening 111'; and wherein an anti-detachment protrusion 113' is formed on a side wall 1121' of the second arc-shaped opening 112', a receiving hole 115' is formed between the anti-detachment protrusion 113' and an end of the second arc-shaped opening 112' that is away from the first arc-shaped opening 111', and the first portion 211' is received in the receiving hole 115'.

Specifically, in the embodiment, the body 20' is cooperated with the arc-shaped opening 11' of the fixing plate 10' through the suspension member 21', so as to rotate. The second portion 212' can be hung on the fixing plate 10' to prevent the body 20' from falling off, as the diameter of the second portion 212' is larger than the width of the second arc-shaped opening 112'. The first portion 211' is adapted to the width of the second arc-shaped opening 112' to provide rotation guidance, while the first arc-shaped opening 111' provides a space for the movement of the second portion 212', thereby ensuring a smooth rotation process. The receiving hole 115' is formed between the anti-detachment protrusion 113' of the side wall 1131' of the second arc-shaped opening 112' and the end. After the first portion 211' is received therein, the anti-detachment protrusion 113' can prevent the first portion 211' from sliding in the direction of the first arc-shaped opening 111', for avoiding accidental displacement of the body 20' in non-operating states. At the same time, the receiving hole 115' is provided to improve the stability during rotation, thereby making the body 20' to be positioned more accurately. The bottom plate 23' of the body 20' and the frame 24' form a closed receiving room 241', for integrating the control board 30' and the lighting component 40' therein, which not only protects internal components from being external influences, but also makes the overall structure compact. Combined with the stepped cooperation of the suspension member 21' and the arc-shaped opening 11', it can ensure connection reliability while achieving the rotational function thereof.

Furthermore, the ceiling lamp further includes a fixing disk 60', wherein the fixing plate 10' is fixed to the fixing disk 60', and the fixing plate 60' is fixed to the ceiling.

Specifically, the fixing plate 60' is provided to allow the ceiling lamp to more flexibly adapt to different types of ceilings (such as a gypsum board, a concrete board etc.). The fixing plate 60' can be designed with a dedicated fixing structure (such as screw holes, etc.) based on the ceiling material, and then connected to the fixing plate 10' through a unified interface, thereby reducing the difficulty of directly installing the fixing plate 10' on complex ceilings. An installation surface of the ceiling has slight unevenness or positional deviation. The fixing plate 60' can be adjusted by itself (such as an installation position of a long waist hole) to offset errors, for ensuring that the fixing plate 10' can be installed horizontally or at a preset angle, thereby avoiding a problem of rotation jamming or an uneven force applied on the body 20' due to an inclination of the fixing plate 10'. When it is necessary to repair the fixing plate 10' or the body 20', the connection between the fixing plate 10' and the fixing disk 60' can be removed first, without directly operating the fixing structure on the ceiling, thereby reducing secondary damage to the ceiling and simplifying the maintenance process.

Furthermore, the fixing disk 60' includes two third arc-shaped openings 61' opposite to each other, and an outer side of the third arc-shaped opening 61' is marked with an angle scale marking 63'.

Specifically, the third arc-shaped opening 61' serves as an adjustment structure on the fixing disk 60' and can be matched with connecting components (such as screws, positioning pins, etc.) on the fixing plate 10' or the ceiling: when the fixing plate 10' is assembled with the fixing disk 60', the connecting components can pass through the third arc-shaped opening 61' and slide along a curvature of the third arc-shaped opening 61', combined with the outer angle scale, to achieve angle adjustment and positioning of the fixing plate 10' relative to the fixing disk 60'. The angle scale marking 63' makes the rotation adjustment process of the fixing plate 10' more intuitive. It can accurately control the adjustment angle through the scale (such as positioning the body 20' at specific angles such as 30°, 45° according to lighting requirements), thereby avoiding deviations caused by performing sensory adjustment and improving operational accuracy thereof. The two opposite third arc-shaped openings 61' form a symmetrical adjustment structure, for ensuring that the fixing plate 10' is balanced in force during the adjustment process, and can be adapted to different angle requirements in different scenarios (such as inclined roof installation, multi-lamp linkage angle calibration, etc.), thereby expanding applicable installation environments of the ceiling lamp. After sliding to a target scale within the third arc-shaped opening 61', the connecting component can be precisely positioned by a locking and fixing way, for forming a complete process of "adjusting-reading-fixing" in conjunction with the scale markings, to prevent angle deviation caused by vibration during being used and ensure the stability of the lighting direction thereof.

Furthermore, the fixing disk 60' further includes two fourth arc-shaped openings 62' opposite to each other, the fourth arc-shaped opening 62' staggered with the third arc-shaped openings 61', and a diameter of a circle where the fourth arc-shaped opening 62' is located is larger than a diameter of a circle where the third arc-shaped opening 61' is located.

Specifically, two opposite fourth arc-shaped openings 62' have been added to the fixing disk 60', which are distributed in a staggered manner (a concentric non-overlapping area) with the third arc-shaped opening 61'. The diameter of the circle where the fourth arc-shaped opening 62' is located is larger than that of the circle where the third arc-shaped opening 61' is located, for forming an inner and outer circle or arc-shaped adjustment structure with different radii. The fourth arc-shaped opening 62' is similar to the third arc-shaped opening 61' and can be matched with the connecting components (such as screws, buckles, etc.) of the fixing plate 10' or the ceiling: after passing through the fourth arc-shaped opening 62', the connecting components can slide along the curvature of the fourth arc-shaped opening 62' and cooperate with an adjustment function of the third arc-shaped opening 61' to achieve multi-angle adjustment and positioning of the fixing plate 10' relative to the fixing disk 60'. Due to their different diameters and staggered positions, they can correspond to different connection points of the fixing plate 10', for forming a dual adjustment support thereof.

Figure 11:
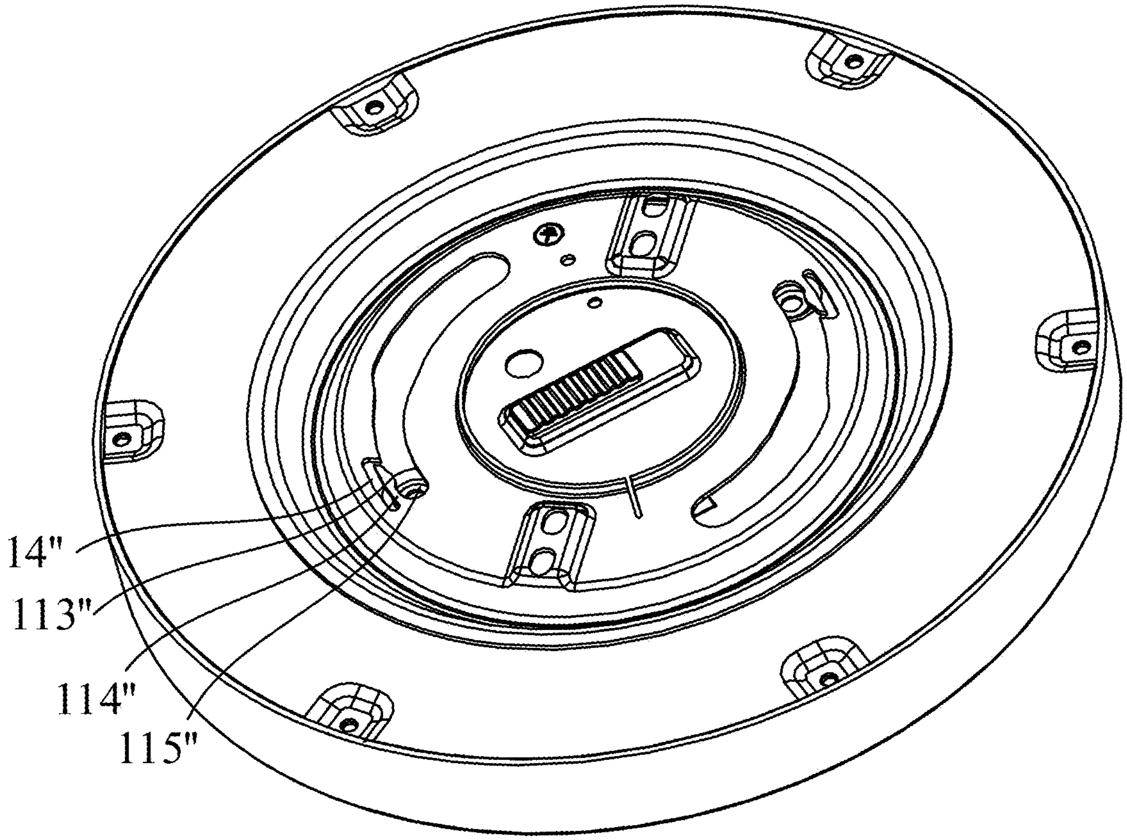
FIG. 11 is a schematic view of a ceiling lamp in accordance with another embodiment of the present disclosure.

Referring to FIG. 11, a ceiling lamp according to another embodiment of the present disclosure is provided. There is also an expansion portion 14" arranged on a portion of the fixing plate that is near the anti-detachment protrusion 113". The expansion portion 14" is connected to the second arc-shaped opening and an elastic wall 114" is formed between the second arc-shaped opening and the expansion portion 14". The anti-detachment protrusion 113" is set on the elastic wall 114".

Specifically, in the embodiment, the body is a circular structure, and the structure of other parts is similar to that of the previous embodiment. The difference is that: the expansion port 14" is connected to the second arc-shaped opening to form the elastic wall 114". When the suspension member (the first portion) of the body enters or leaves the receiving hole 115" of the second arc-shaped opening, the elastic wall 114" where the anti-detachment protrusion 113" is located can undergo elastic deformation. During assembly, the first portion squeezes the anti-detachment protrusion 113" so that the elastic wall 114" is to bend under a force, for providing a passage space for the first portion. After assembly, the elastic wall 114" is reset, and the anti-detachment protrusion 113" returns to its original position for forming a closed receiving hole 115" with the end of the second arc-shaped opening, thereby restricting the first portion within the receiving hole 115".

The deformation ability of the elastic wall 114" enables the installation of the suspension member without performing precise alignment or strong pressing, and automatically adapts to the first portion for pass therethrough by the elastic deformation thereof, thereby reducing assembly difficulty thereof. In a natural state, the elastic wall 114" supports the anti-detachment protrusion 113" to maintain a blocking position thereof, for ensuring to stably position the first portion within the receiving hole 115". When the body is impacted by external forces, the elastic wall 114" can buffer the impact force through micro deformation thereof, to reduce a fracture risk of the anti-detachment protrusion 113", and extend the service life of the structure. Compared to rigid anti-detachment structures, the elastic wall 114" is provided to allow for a certain degree of dimensional tolerance. Even if there are slight machining errors in the suspension member or arc-shaped openings, reliable fit can still be achieved through deformation thereof, thereby improving production error rates thereof. When the body needs to be disassembled, the elastic wall 114" can be deformed by the external force (such as pressing the anti-detachment protrusion 113"), for easily releasing the first portion without damaging the structure, thereby simplifying the operation process of maintenance or component replacement thereof.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A ceiling lamp comprising:

a fixing plate installed on a ceiling;

a body rotatably mounted on the fixing plate;

a control board received in the body;

a lighting member received in the body; and wherein the fixing plate comprises two arc-shaped openings symmetrically arranged about a central axis of the fixing plate, each of the two arc-shaped openings comprising a first arc-shaped opening and a second arc-shaped opening, wherein a width of the first arc-shaped opening is greater than a width of the second arc-shaped opening; and wherein two suspension members are installed on the body and corresponding to the fixing plate, each of the two suspension members is a stepped-shaft structure and comprises a first portion and a second portion arranged at an end of the first portion that is away from the body, wherein a diameter of the first portion is adapted to the width of the second arc-shaped opening, and a diameter of the second portion is larger than the width of the second arc-shaped opening and smaller than the width of the first arc-shaped opening, the second portion suspended on the fixing plate; and wherein a plurality of bulges is arranged at intervals on the body and corresponding to the two arc-shaped openings, and evenly distributed around a central axis of the fixing plate, an elastic member installed on the fixing plate and abutting against the body; and wherein when the body rotates, the elastic member is lifted by one of the plurality of bulges and then enters between two adjacent bulges to produce a sound thereof.

2. The ceiling lamp as claimed in claim 1, wherein the elastic member comprises a housing, an elastic element and a sliding element, one end of the housing passing through the fixing plate, and the other end of the housing comprising a flanging attached to the fixing plate, the housing comprising a chamber that faces the body, the elastic element and the sliding element sequentially arranged in the chamber, and a part of the sliding element extending out of the chamber to elastically abut against the body.

3. The ceiling lamp as claimed in claim 2, wherein the sliding element is a spherical structure, and a diameter of a side of the chamber that is near the body is smaller than a diameter of the sliding element, so that the sliding element slides inside the chamber.

4. The ceiling lamp as claimed in claim 3, wherein an anti-detachment protrusion is formed on a side wall of the second arc-shaped opening that is near the first arc-shaped opening; and wherein when the first portion slides from the first arc-shaped opening into the second arc-shaped opening and is positioned, the anti-detachment protrusion is configured to form a lateral obstruction to the first portion.

5. The ceiling lamp as claimed in claim 4, wherein the anti-detachment protrusion is an arc-shaped structure; and wherein the anti-detachment protrusion extends from the side wall of the second arc-shaped opening to the inside of the second arc-shaped opening, to form a locally reduced size area thereof.

6. The ceiling lamp as claimed in claim 5, wherein the body comprises a bottom plate and a frame, wherein a receiving room is formed inside the frame, and the bottom plate covers on the frame, wherein the control board and the lighting member are arranged inside the receiving room.

7. The ceiling lamp as claimed in claim 6, wherein the bottom plate is recessed towards a side that is away from the fixing plate to form a complete circle of groove, wherein the fixing plate comprises a protruding wall adapted to the groove and correspondingly inserted into the groove.

8. The ceiling lamp as claimed in claim 7, wherein a cross-sectional shape of the groove is V-shaped.

9. The ceiling lamp as claimed in claim 6, wherein the body further comprises a flexible backing plate, a receiving groove formed between the frame and the bottom plate, the flexible backing plate installed within the receiving groove and extending out of the receiving groove.

10. The ceiling lamp as claimed in claim 7, wherein the lighting member comprises an LED light board electrically connected to the control board, and a transparent cover arranged on a side of the body that is away from the fixing plate.

11. The ceiling lamp as claimed in claim 10, wherein an angle between two adjacent bulges ranges from 2 degrees to 8 degrees; and wherein the angle between the two adjacent bulges is formed between midlines of the two adjacent bulges.

12. The ceiling lamp as claimed in claim 11, wherein the angle between the two adjacent bulges is 5 degrees.

13. The ceiling lamp as claimed in claim 12, wherein a gap is formed between every two adjacent bulges so that the elastic member slides in the gap, the elastic member moves back and forth between the gaps of adjacent bulges when the body rotates.

14. The ceiling lamp as claimed in claim 13, wherein the fixing plate comprises an expansion portion formed near the anti-detachment protrusion and connected to the second arc-shaped opening, an elastic wall formed between the second arc-shaped opening and the expansion portion, the anti-detachment protrusion arranged on the elastic wall.

15. The ceiling lamp as claimed in claim 12, wherein both the fixing plate and the bottom plate are sheet metal parts.

16. The ceiling lamp as claimed in claim 11, wherein the flanging is fixed to the fixing plate by an adhesive bonding way.

17. The ceiling lamp as claimed in claim 3, wherein the frame is square.

* * * * *